Patented Sept. 23, 1952

2,611,748

UNITED STATES PATENT OFFICE 2,611,748

CHEMICAL INDICATOR FOR ALKYL-CHLOROARSINES

Kenneth E. Wilzbach, Chicago, Ill., assignor to the United States of America as represented by the Secretary of War No Drawing. Application March 17, 1944, Serial No. 527,009

1 Claim. (Cl. 252—408)

The invention described herein may be manufactured and used by or for the Government, for governmental purposes, without the payment to me of any royalty thereon.

This invention relates to a chemical reagent composition particularly useful as a direct, specific detector for certain noxious arsenical vapors. Since certain important arsenical compounds, as well as a number of other toxic agents, cannot be sensed by their odor, especially at low concentrations, when they begin to exert injurious effects, detector devices are necessary for warning against their presence. In order to be practicable, a detector device should be reasonably sensitive, easily used and have suitable stability. It is also required to be specific in order to determine the precautions to be taken.

An object of this invention is to provide a direct, specific and reasonably sensitive test for certain arsenical substances, particularly of the alkyl-chloroarsine type, such as methyldichloroarsine and ethyldichloroarsine. For attaining the foregoing object and further objects which will become apparent from the following description, I have found an effective reagent which, broadly described, comprises a salt of a metal in the zinc, cadmium and mercury column of group II in the periodical table mixed with a suitable oxy-compound of a hexavalent group VI metal in a gel.

The reagent is exemplified more specifically by silica gel impregnated with a mixture of zinc sulfate and molybdic acid (85%). This composition is a direct, specific and sensitive detector for the alkyl-dichloroarsines and closely related organo-arsenic halides. The stability of this reagent is satisfactory.

To illustrate the method of preparing the reagent composition and the procedure for using the reagent, the following examples are presented.

The preparation of the molybdenum compound requires special care to obtain the desired sensitivity. A molybdate solution preferably should contain about 10% molybdic oxide and be of a proper pH. There are several ways of preparing such solution. Possibly the simplest is to make a 1% (practically saturated) solution of molybdic acid (85%) in distilled water and then to heat this on a steam bath until about 90% of the water is evaporated. The resultant solution appears to be clear and does not form a precipitate on standing for a few days.

A solution which has similar properties can be prepared by dissolving 1.0 g. of ammonium molybdate $(NH_4)_6Mo_7O_{24} \cdot 4H_2O$ in 10 ml. of 2.5% by weight $H_2SO_4$.

Solid ammonium molybdate loses about 15% of its weight if it is kept in an open dish at 90° C. for two days. A 10% solution of this material has about the same properties as the other two described solutions. However, if the heat treatment is omitted, a 10% solution of ammonium molybdate is unsatisfactory, since this solution throws down a white precipitate when it is mixed with a zinc sulfate solution.

A zinc sulfate solution is prepared by dissolving 10 g. of $ZnSO_4 \cdot 7H_2O$ in 10 ml. of distilled water. Zinc chloride may be used in place of the sulphate, but it is less convenient to handle and tends to result in a gel which appears to be less stable at elevated temperatures.

A gel is impregnated by mixing 5 ml. each of the zinc sulfate and molybdate solutions, and pouring the mixture with vigorous stirring onto 10 g. of washed silica gel. The impregnated gel is dried at about 65° C. and at a pressure of 5 mm. mercury for two hours.

An assembled detector tube is made to contain about 1 cm. plug of the impregnated gel held in place by organdy retaining discs or wads of inert fibrous material. The glass tube may be of any convenient size for use with a hand pump.

Tubes prepared according to the preceding directions are quite stable at ordinary temperatures. At 60° C. their appearance is not changed on storage for a substantial period, particularly if kept in sealed ampoules or glass-stoppered bottles. Wrappers or sealing caps made of stable plastics may be used on the tubes to preserve the reagent.

To test the reagent in the detector tubes, one or more pumpfuls of air known to be contaminated with a certain concentration of an arsenical, such as an alkyl-dichloroarsine, are drawn through a detector tube and after waiting one minute, the tube is inspected for the appearance of a color. A blue or green coloration at the intake end of the gel filling indicates the presence of the arsenical. At low temperatures a longer time is allowed for the appearance of the color.

Detector tubes containing the described type of reagent are capable of detecting 1, 2.5 and 3 gamma of ethyldichloroarsine, methyldichloroarsine and phenyldichloroarsine, respectively. The reagent is not particularly sensitive to chlorvinyl dichloroarsines, especially under conditions of high humidity; but this sensitivity can be improved by heating the tube at 100° C. for one minute. For a given composition, the sensitivities of the reagents are independent of the concentrations of the arsenicals.

This test for the organo-arsenic compounds is remarkably specific. It is not given by arsine, $AsH_3$. The reagent is also inert to relatively large quantities of the other common chemical warfare agents, including mustards, phosgene, various cyanides and other sulfur and halogen-containing organic compounds, as well as to sulfur dioxide, hydrocarbon vapors, carbon monoxide, etc. At very high concentrations, hydrogen sulfide produces a direct heavy test; but even this compound fails to give a test at a concentration of 100 gamma per liter.

A large number of molybdate gels were investigated, in which the composition and condition of impregnation were varied. The effects of a number of additives were also investigated. While practically all the molybdate gels produce a blue color if they are heated to about 100 or 200° C., after being exposed to certain reducing agents, only the zinc-molybdate type gel herein described gives a direct test of sufficient sensitivity for detecting the presence of the organo-arsenic halides. Somewhat insensitive direct tests were obtained with gels impregnated with molybdate and cadmium or mercury salts, such as $CdCl_2$ or $HgCl_2$.

The sensitivity of the zinc-molybdate type gel increases with the concentrations of both reagents to some extent. At low concentrations the effect of increasing the concentration of molybdate is marked, but tends to become negligible above 5%. A preferred concentration for zinc sulfate in gels containing about 5.5% molybdic acid is about 1%. If the concentration of the zinc sulfate is decreased below this value, the sensitivity of the reagent falls off very rapidly; but it increases slightly for changes from 1 to about 5.5%.

The pH of the impregnating solution is another factor. All the satisfactory gels were impregnated from solutions whose molybdate component had pH values ranging from about 4.8 to about 4.95. It is desirable to avoid a substantial deviation of pH from this range. Detector tubes containing the described type of reagent may be readily used in the field by persons who are unskilled in making chemical analyses. The reagent may also be used in industrial applications.

It is to be understood that modifications come within the spirit and scope of the invention and that the invention is not to be limited by any theory nor by the specific examples given for the purpose of illustration.

I claim:

A chemical reagent highly sensitive and specific as an indicator of alkyl-arsenic-dichlorides comprising a gel containing about 1 to 5.5% by weight of zinc sulfate and about 1 to 5.5% by weight of molybdic acid.

KENNETH E. WILZBACH.

REFERENCES CITED

The following references are of record in the file of this patent:

UNITED STATES PATENTS

| Number | Name | Date |
|---|---|---|
| 1,151,929 | Duden et al. | Aug. 31, 1915 |
| 1,540,445 | Wilson | June 2, 1925 |
| 1,668,838 | Bloomfield | May 8, 1928 |
| 1,694,620 | Jaeger | Dec. 11, 1928 |
| 1,774,432 | Franklin | Aug. 26, 1930 |
| 1,776,875 | Wietzel | Sept. 30, 1930 |
| 1,839,168 | Stampe | Dec. 29, 1931 |
| 1,863,670 | Pier | June 21, 1932 |
| 1,900,751 | Baehr | Mar. 7, 1933 |
| 1,922,499 | Pier et al. | Aug. 15, 1933 |
| 1,998,626 | Koenig | Apr. 23, 1935 |
| 2,129,649 | Cross, Jr., et al. | Sept. 15, 1938 |
| 2,204,619 | Pier et al. | June 18, 1940 |

OTHER REFERENCES

"Vapor Detector Tubes," Paul E. Fenton, J. Chem. Educ., vol. 20, pp. 564–5, 1943; abstracted in Chem. Abstracts, vol. 38, March 10, 1944, col. 898.